(12) United States Patent
Don et al.

(10) Patent No.: US 12,386,532 B2
(45) Date of Patent: Aug. 12, 2025

(54) PROTECTING DATA FROM UNPRIVILEGED PROCESSES

(71) Applicant: Dell Products, L.P., Round Rock, TX (US)

(72) Inventors: Arieh Don, Newton, MA (US); Efi Levi, Beer Sheba (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 18/301,851

(22) Filed: Apr. 17, 2023

(65) Prior Publication Data
US 2024/0345752 A1 Oct. 17, 2024

(51) Int. Cl.
*G06F 3/06* (2006.01)

(52) U.S. Cl.
CPC ............ *G06F 3/064* (2013.01); *G06F 3/0659* (2013.01); *G06F 3/0665* (2013.01); *G06F 3/0685* (2013.01); *G06F 3/0607* (2013.01)

(58) Field of Classification Search
CPC .......... G06F 3/06; G06F 3/064; G06F 3/0659; G06F 3/0665; G06F 3/0685; G06F 3/0607
See application file for complete search history.

(56) References Cited

U.S. PATENT DOCUMENTS

| 8,224,873 B1* | 7/2012 | Korablev ................ H04L 63/08 707/809 |
| 2018/0189522 A1* | 7/2018 | Kwasnick ............... G06F 21/10 |
| 2021/0141623 A1* | 5/2021 | Bequet .................... G06F 9/546 |
| 2021/0319171 A1* | 10/2021 | Wallace .................. G06F 9/451 |
| 2024/0070151 A1* | 2/2024 | Khalyknazarov ... G06F 16/2445 |
| 2024/0080279 A1* | 3/2024 | Galles ................. H04L 49/3063 |

FOREIGN PATENT DOCUMENTS

EP 2434441 A1 * 3/2012 ....... G06F 17/30067

OTHER PUBLICATIONS

S. Seshadri et al., "Software defined just-in-time caching in an enterprise storage system," in IBM Journal of Research and Development, vol. 58, No. 2/3, pp. 7:1-7:13, Mar.-May 2014.*
A. Devulapalli, D. Dalessandro, P. Wyckoff, N. Ali and P. Sadayappan, "Integrating parallel file systems with object-based storage devices," SC '07: Proceedings of the 2007 ACM/IEEE Conference on Supercomputing, Reno, NV, USA, 2007, pp. 1-10.*

* cited by examiner

*Primary Examiner* — Pierre Michel Bataille
(74) *Attorney, Agent, or Firm* — Amin, Turocy & Watson, LLP

(57) ABSTRACT

A storage array is configured with an allowed process configuration. An allowed process may correspond to an application or process executed by a host computing system that may seek to access a volume of the storage array via a command descriptor block message or a corresponding block command message, which may comprise a data field and a metadata field. The host may embed a process identifier corresponding to a process seeking to access the storage array in the metadata field. The storage array may receive the block command message and determine whether the metadata field comprises a process identifier that is included in the allowed process configuration. If so, the storage array may perform the access command corresponding to the block command message. If not, the storage array may reject performing the access command. The storage array may report access commands that were performed or rejected.

20 Claims, 11 Drawing Sheets

PROTECTING DATA FROM UNPRIVILEGED PROCESSES

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise storage components such as hard drives or solid state drives, random access memory, ("RAM"), and central processing unit ("CPU") resources.

Data storage computer systems or components can facilitate the storage and manipulation of data by a variety of different network equipment. Data may be stored on a network storage component, which may be referred to as a storage or a storage array, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise transmitting, by a host computing device comprising a processor to a storage array, an initial application configuration, comprising an application identifier corresponding to a configured application configured to be executed by the host computing device. The initial application configuration may be referred to as an accepted process configuration and may be used to indicate, to the storage array, processes executed by, or that may be executed by, the host computing device that have been accepted for communication with the storage array, by an administrator corresponding to the storage array or by an administrator corresponding to the host computing device. The accepted process configuration may be generated by a management console. The method may further comprise executing, by the host computing device, the configured application to result in an executing application, wherein the executing application corresponds to the application identifier. The method may further comprise, generating, by the host computing device, an application-identified block command message, corresponding to the executing application, that may comprise a data field and a metadata field; the data field may comprise application information and the metadata field may comprise the application identifier. The method may further comprise transmitting, by the host computing device to the storage array, the application-identified block command message, wherein the application identifier inserted into the metadata field is to be used by the storage array to determine, before performing an operation corresponding to the application information transmitted in the data field, that the initial application configuration comprises the application identifier transmitted in the metadata field of the application-identified command block message. The application-identified block command message may be a small computer system interface ("SCSI") protocol message. The metadata field may be part of a data integrity field.

In an embodiment, the initial application configuration may comprise an association, or mapping, between the configured application configured to be executed by the host computing device and at least one logical volume corresponding to the storage array.

In an embodiment, the executing application may correspond to a process and the application identifier may comprise a process identifier corresponding to the process. The initial application configuration may comprise a process index corresponding to the process identifier, and the application identifier in the metadata field of the application-identified block command message may comprise the process index.

In an embodiment, the initial application configuration may comprise an association between the configured application configured to be executed by the host computing device and at least one logical volume corresponding to the storage array. The method may further comprise requesting, by the host computing device from the storage array, a volume-specific process allowance report indicative of performance of the operation corresponding to the application information transmitted in the data field of the application-identified command block message. The method may further comprise receiving, from the storage array, the volume-specific process allowance report indicative of the performance of the operation corresponding to the application information transmitted in the data field of the application-identified command block message with respect to the at least one logical volume corresponding to the storage array.

In an embodiment, the method may further comprise determining, by the host computing device, to remove the application identifier corresponding to the configured application configured to be executed by the host computing device from the initial application configuration. In an embodiment, the storage array may determine that a block command message comprises corrupted data, or data comprising malware, and the storage array may deem the process that requested access to the storage array with respect to the data in the block command message to be malware, or another form of untrusted application or process. The method may further comprise updating, by the host computing device, or in an embodiment by the storage array, the initial application configuration to be indicative that the configured application is no longer configured to be executed by the host computing device, to result in an updated application configuration. The method may further comprise transmitting, by the host computing device to the computing storage array, the updated application configuration to the storage array to be used, by the computing storage array, instead of the initial application configuration.

In another example embodiment, a host computing device may comprise a processor configured to generate an application configuration comprising an application identifier corresponding to an application. The processor may be further configured to transmit, to a storage array, the application configuration. Responsive to the application configuration being transmitted, the processor may be configured to receive a control command corresponding to a data manipulation action, corresponding to the application, and corresponding to the storage array. Responsive to the control command being received, the processor may be configured to generate a block command message comprising a data field and a metadata field, wherein the data field comprises data corresponding to the control command, and wherein the metadata field comprises an application identifier corresponding to the application. The processor may be further configured to transmit, to the storage array, the block command message. The application identifier contained in the metadata field may be used by the storage array to determine, before performing the data manipulation action, that the application configuration comprises the application identifier contained in the metadata field.

The block command message may be a small computer system interface protocol message. A data integrity field may comprise the metadata field. The meta data field may be an App Tag field. The data integrity field may be designed to comprise SCSI block protocol Protection Information. The application may correspond to a process, and the application identifier may comprise a process identifier corresponding to the process. The application identifier may comprise a process index corresponding to the process. The application configuration may comprise a process index corresponding to the process identifier, and the application identifier may comprise the process index. In an embodiment, the small computer system interface protocol message may be transmitted according to a fibre channel protocol.

In yet another example embodiment, a non-transitory machine-readable medium may comprise executable instructions that, when executed by a processor of a storage array, facilitate performance of operations that may comprising receiving, from a host computing device, an application configuration comprising a configured application identifier corresponding to a configured application, controllable by, or that may control, the host computing device, configured to manipulate data with respect to a volume corresponding to the storage array. The operations may further comprise receiving, from the host computing device, an application-identified block command message, wherein the application-identified block command message comprises a data field and a metadata field, wherein the data field corresponds to a data-manipulation command, and wherein the metadata field comprises a requesting application identifier indicative of a requesting application, being controlled by, or controlling, the host computing device, that has requested performance of the data-manipulation command with respect to stored information stored by the volume corresponding to the storage array. The operations may comprise, responsive to the application-identified block command message, determining correspondence of the requesting application identifier to the configured application identifier to result in a determined application correspondence indication indicative of the correspondence of the requesting application identifier to the configured application identifier. The operations may further comprise manipulating the stored information stored by the volume corresponding to the storage array according to the determined application correspondence indication.

In an embodiment, the determined application correspondence indication may be indicative of the requesting application identifier and the configured application identifier being the same, and the manipulating of the stored information stored by the volume corresponding to the storage array may comprise performing the data-manipulation command.

In an embodiment, the data-manipulation command may be at least one of: a read command or a write command.

In an embodiment, the determined application correspondence indication may be indicative of the requesting application identifier and the configured application identifier being different, and the manipulating of the stored information stored by the volume corresponding to the storage array may comprise non-performance of the data-manipulation command.

In an embodiment, the configured application may correspond to a process. the application identifier may comprise a process identifier corresponding to the process, the application configuration may comprise a process index corresponding to the process identifier, and the requesting application identifier received in the metadata field of the application-identified command block message comprises the process index.

In an embodiment, the application-identified block command message may comprise 520 bytes, the data field of the application-identified block command message may comprise 512 bytes, the metadata field of the application-identified command block message may be an eight-byte field that comprises a two-byte App Tag field, and the requesting application identifier may be received in the two-byte App Tag field.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
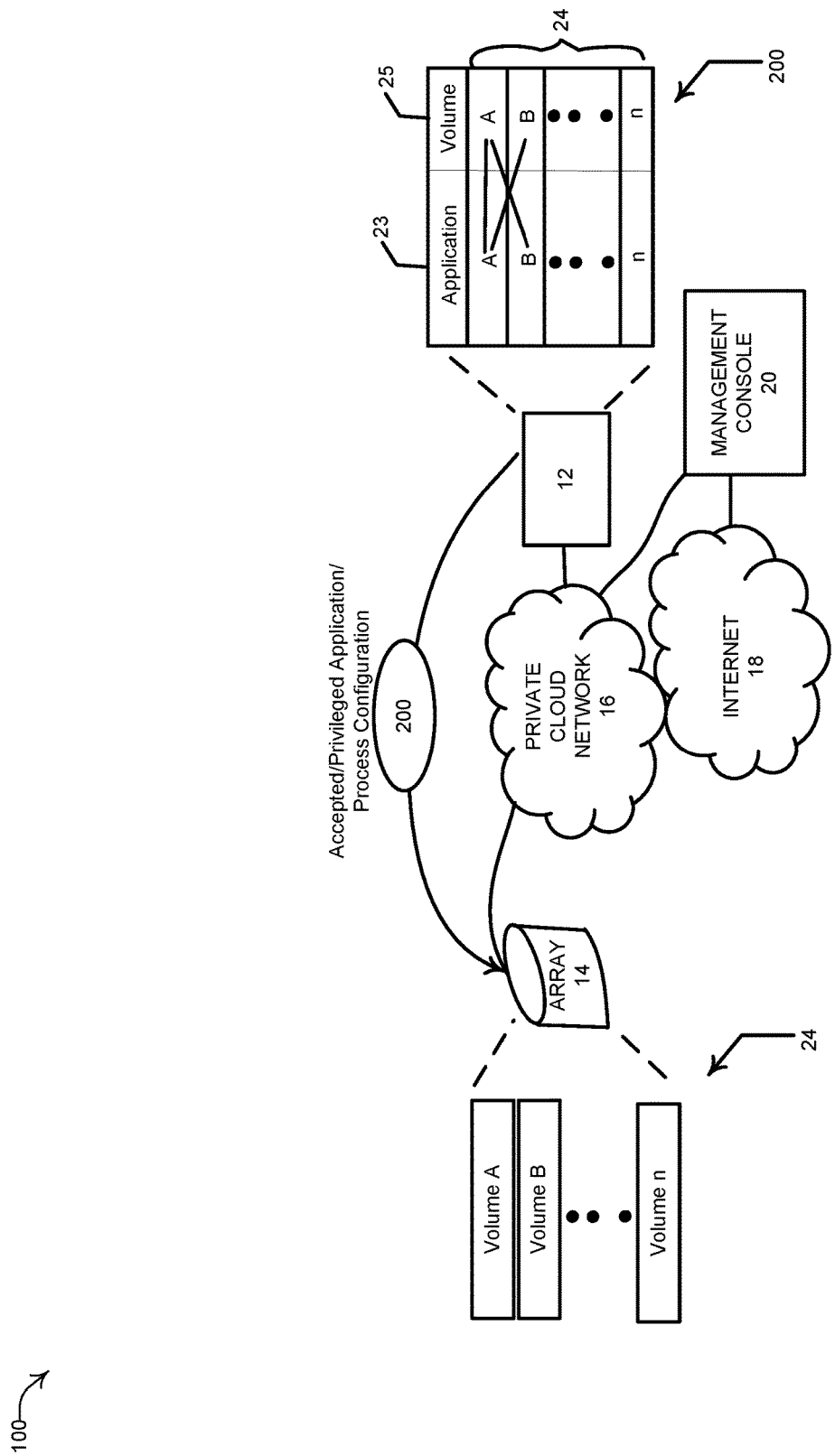
FIG. 1 illustrates an example computing environment.

FIG. 1 illustrates a diagram of an example computing network environment 100 that comprises a host computing system 12, or host computing device, that may communicate with a storage array 14 via a private cloud network 16. Private cloud network may be accessible by a public communication network, for example Internet 18. A management console 20 may be used to manage it was computing device 12 or storage array 14. Management console is shown connected to public Internet 18 but may be connected to private cloud network 16 without being connected to the Internet.

A storage array 14 may comprise multiple volumes 24A, 24B . . . 24n, and may communicate with host computing systems 12, or a computing device thereof, using interface protocol commands and message corresponding to an interface data transfer protocol, such as, for example, Small Computer System Interface ("SCSI") commands. A SCSI command may be transmitted via a command descriptor block ("CDB") message. A SCSI input message or a SCSI output message comprising data to be written or read may be referred to as a block command message. The interface data transfer protocol may be Fibre Channel Protocol ("FCP"), which may use a similar command set as the SCSI protocol. An FCP command may be adapted for use with computing devices that are connected via a fiber optic fiber or that are connected via electrical conductors of an electrical cable.

Host computing system 12 may execute, or run, one or more applications or processes. The processes may be identified in an application identifier field 23, or process identifier field, of a configuration 200. Configuration 200 may comprise a table, a database, or other form of organizing data or information. Application identifiers in field 23 may be associated with, or mapped to, logical volumes 24 of storage array 14 identified in volume field 25. For example, as shown in configuration table 200, application A is configured to communicate with volume A and volume B, whereas application B is only configured to communicate with volume A. Communication between an application or process running on host computing system 12 may comprise providing commands to storage array 14 to perform actions, for example read or write commands with respect to data that may be transmitted in a block command message by, or requested to be received by, an application or process running at the host computing system. Application configuration table 200 may be transmitted by host computing system 12 to storage array 14 to be used by the storage array to determine whether to perform an action with respect to data, such as data that may be received in, or requested to be transmitted in, a block command message.

A host computing system 12 shown in FIG. 1 may run, execute, or be controlled by, management software, for example Unisphere® software offered by Dell Inc., which software may facilitate management console 20 shown in FIG. 1. Management console 20 may be facilitated by one or more components that may be part of a suite of cloud computing management system services, such as APEX® system services offered by Dell Inc.

A SCSI command, or a FCP command, may be a non-data command (an "N" command), a command to write data from an initiator device to a target device (a "W" command), a command to read data from a target device (an "R" command), or a bidirectional command (a "B" command). A drive, or volume of a drive, of a storage array 14 may comprise logical blocks, which may be referred to as sectors, that may be addressed by a Logical Block Address ("LBA"), and may comprise 512 bytes, (e.g., may be 512 bytes in size). However, a drive, or volume of a drive, of a storage array 14 may comprise logical blocks. or sectors, that may comprise 520 bytes, or that may be 520 bytes in size.

In embodiments, an array 14 may comprise a processor and a storage device as one or more hard disk drives or one or more solid state drives. According to multiple embodiments, an array 14 can further comprise memory that can store one or more computer and/or machine readable, writable, and/or executable components and/or instructions that, when executed by a processor, can facilitate performance of operations defined by the executable component(s) and/or instruction(s). In embodiments, a memory of an array 14 can store one or more computer and/or machine readable, writable, and/or executable components and/or instructions, which can, when executed by a processor of the array, facilitate performance of operations defined by the executable component, and other components described or suggested by different embodiments described herein, that can improve the operation of system 100 shown in FIG. 1. A reference made herein to an array, or to a storage, may comprise a reference to a storage array, such as storage array 14. Communication links between one or more storage arrays 14 and private cloud 16 may comprise one or more light fibers or one or more electrical conductors. Communication links between one or more host computing devices 12 and private cloud 16 may comprise one or more light fibers or one or more electrical conductors.

Many host computing devices 12 (e.g., thousands of host computing devices) may be able to access a storage array 14. Hosts 12 may communicate with an array 14 according to a communication protocol, such as SCSI over FCP, SCSI over Ethernet ("iSCSI"), Non-volatile Memory Express ("NVMe") over FCP, NVMe over Transmission Control Protocol, and the like. Some protocols may facilitate a one-time security token being used when a host 12 logs in to an array 14, for example, Challenge Handshake Authentication Protocol ("CHAP") in iSCSI. However, other protocols for example, SCSI over FCP, NVMe over FCP do not.

MultiPath Input Output ("MPIO") may refer to a framework to configure load balancing and failover processes for connections to storage devices, such as array 14. A storage array may facilitate load balancing via multiple controllers. MPIO may facilitate spreading input/output load and handling internal failover from one path to another and may prevent a server from 'seeing' multiple instances of the same disk, or logical volume. Multipathing techniques may use redundant physical path components like adapters, cables, and network switches, to create logical paths between a server and a storage device. In the event that one or more of these components fails, causing the path to fail, multipathing logic may use an alternate path for input/output so that applications can still access data. Each network interface card, or Host Bus Adapter ("HBA"), may be connected to network 16 using redundant network switching techniques to provide continued access to storage in the event of a component failure.

An application, for example a relational database management system application, may store a large amount of data that may be spread across multiple volumes of a storage array. Furthermore, different instances of the same relational database management system application may spread respective data across the same volumes of a storage array. An MPIO driver, or an MPIO application corresponding to a HBA that may connect a host computing device 12 to network 16, may keep track of one or more applications, or one or more instance of one or more applications, (it will be appreciated that an application may correspond to, or may be referred to, as a process or an instant), and one or more volumes that an application/process may use to store data. An application, or a process, may be associated with a corresponding process identifier ("PID"). An administrator, or a computing system performing administrative functions, make configure storage array 14 to accept or allow communications from one or more applications or processes according to a PID corresponding, respectively, to the one or more applications. Management console 20 may be used to generate, or may generate, configuration 200.

Figure 2:
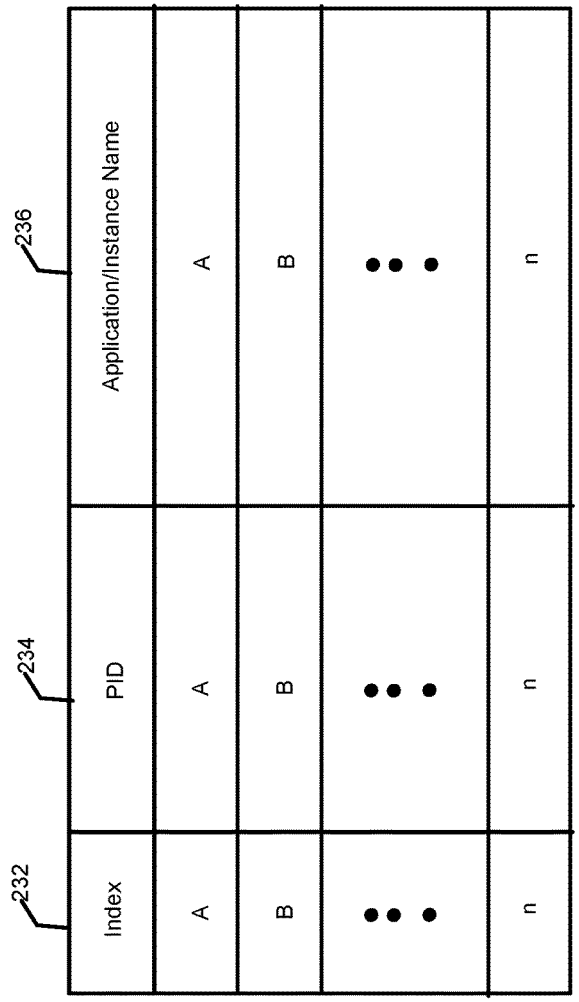
FIG. 2 illustrates an example authorized process configuration.

An example configuration table 200 is shown in FIG. 2. Configuration 200 may comprise an application name or an application instance name in field 236. Field 234 may comprise PIDs corresponding, respectively, to application names in field 236. Index field 232 may comprise indexes corresponding, respectively, to PIDs in field 234 and process names in field 236. An index in field 232 may be, or may facilitate, a standard, or uniform, identifier style having a fixed length to be indicative to storage array 14 shown in FIG. 1 of applications, or processes, included in fields 236 or 234 of configuration 200 shown in FIG. 2. Configuration 200 may comprise applications or processes that are authorized to communicate with volumes 24 of storage array 14 via private cloud network 16.

Figure 3:
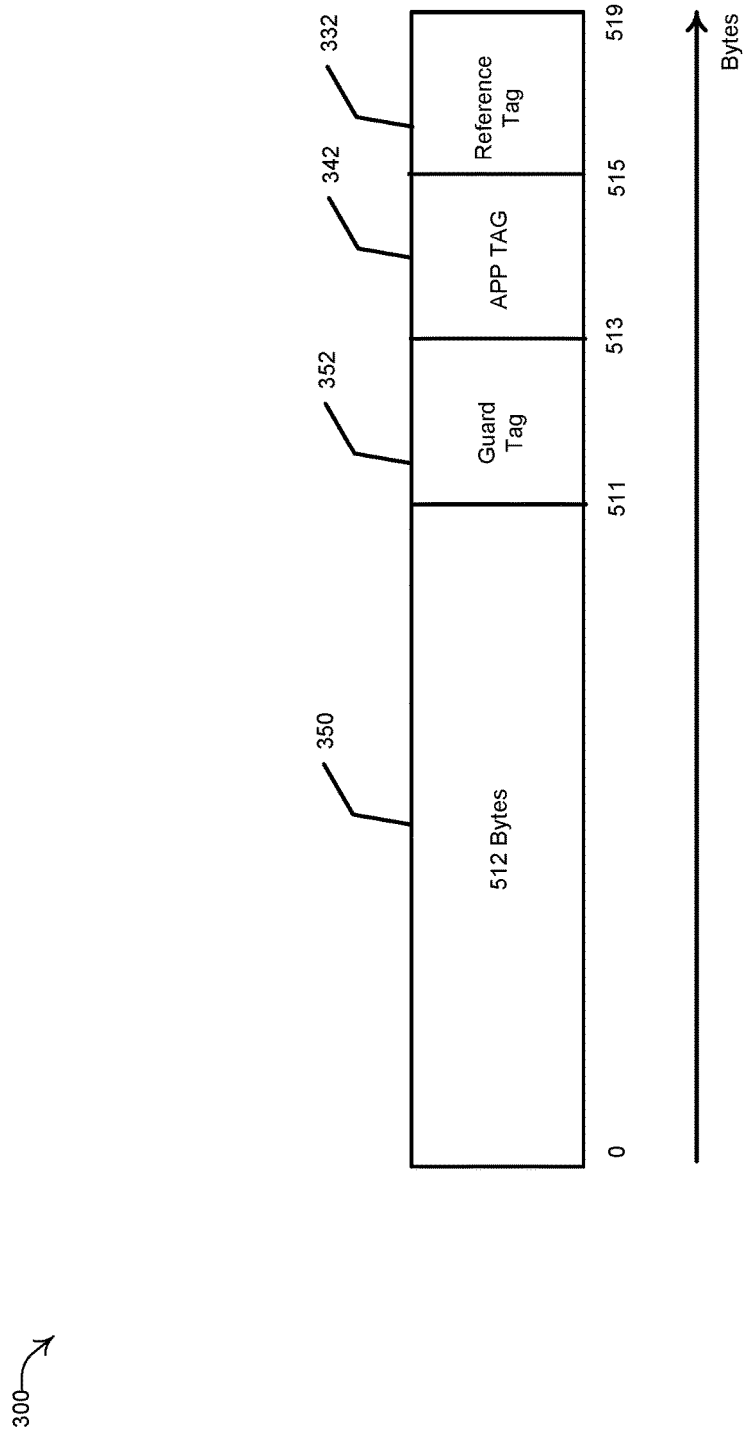
FIG. 3 illustrates a block command message with an App Tag field.

Turning now to FIG. 3, an example block command message 300 is shown. A block command message 300 may comprise 512-byte data field 350, guard tag field 352, App Tag field 342, and reference tag field 332. Data field 350 of block command message 300 may be used to transport data between host computing system 12 and storage array 14. For example, a write command may be sent from computing system 12 to array 14 in a CDB command message corresponding to a message 300, which may comprise data in data field 350 to be written to a volume of array 14. Fields 352, 342, and 332 may comprise metadata and may be collectively referred to as protection information ("PI") that may be used to verify data contained in data field 350. For example, PI information in guard tag field 352 may protect the data in field 350 using, for example, a cyclic redundancy check value corresponding to the data in the data field. Conventionally, App Tag field 332 may be used to indicate an algorithm that was used to derive a value in guard tag field 352. Reference tag 332 may conventionally be used to avoid erroneous write operations. However, use of App Tag field 352 to indicate an algorithm may be redundant because an MPIO may have access to an algorithm that was used to generate the value contained in guard tag field 352.

Figure 4:
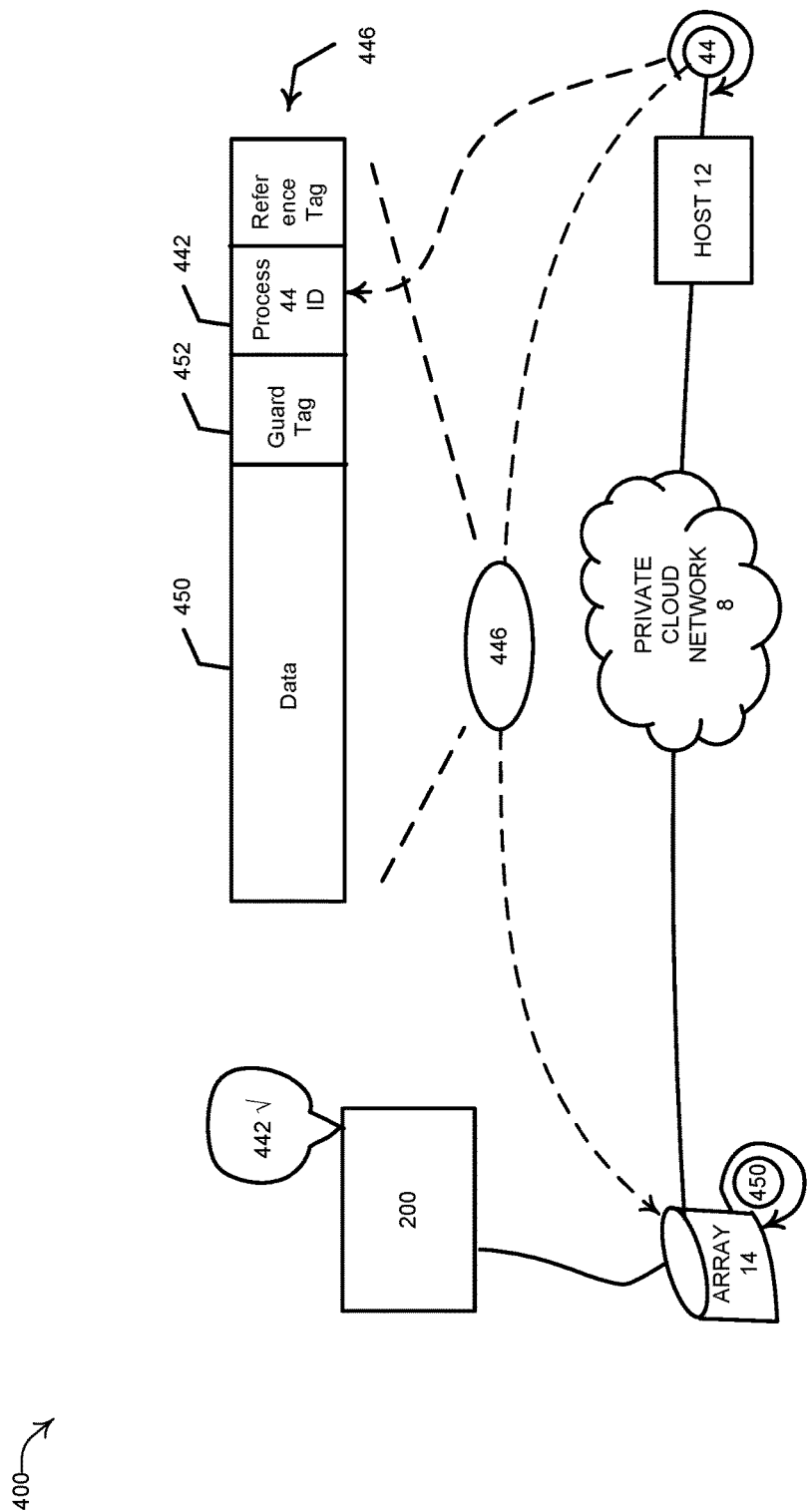
FIG. 4 illustrates an example computing environment with a storage array implementing a command corresponding to a block command message, transmitted by a host computing device, having an application/processor identifier in an App Tag field matching a configured approved application identifier.

Accordingly, as shown in FIG. 4, a host computing device 12 may communicate data to be written, for example, to storage array 14 via a block command message 446 that comprises a PID in App Tag field 442 instead of the App Tag field comprising an indication of an algorithm that may have been used to generate a value contained in guard tag field 452. The PID in App Tag field 442 may comprise an identifier, an index, or a name, corresponding to process 44 running on, or being executed by, host computing device 12. Upon receiving block command message 446, storage array 14 may determine whether the identifier contained in App Tag field 442 of block command message 446 corresponds to a process, or application, contained in configuration table 200 received from host computing device 12, or received from management console 20, as described in reference to FIG. 1. Thus, if App Tag field 442 comprises a PID corresponding to process 44, and if process 44 was configured via configuration 200 as being an acceptable process (e.g., a process having access privileges corresponding to storage array 14), the PID in the App Tag field may be indicative to the storage array that process 44 has been authorized to communicate with storage array 14. Accordingly, if storage array 14 determines that an identifier corresponding to process 44 is indicative that process 44 has been configured, via table 200, as a process with respect to which the storage array should perform an action received in a command message generated by the application (indicated by the 'V' in the bubble above table 200 in FIG. 4), then the storage array may perform the action, for example, the array may write data 450 to a volume 24 (shown in FIG. 1) corresponding to process 44.

Figure 5:
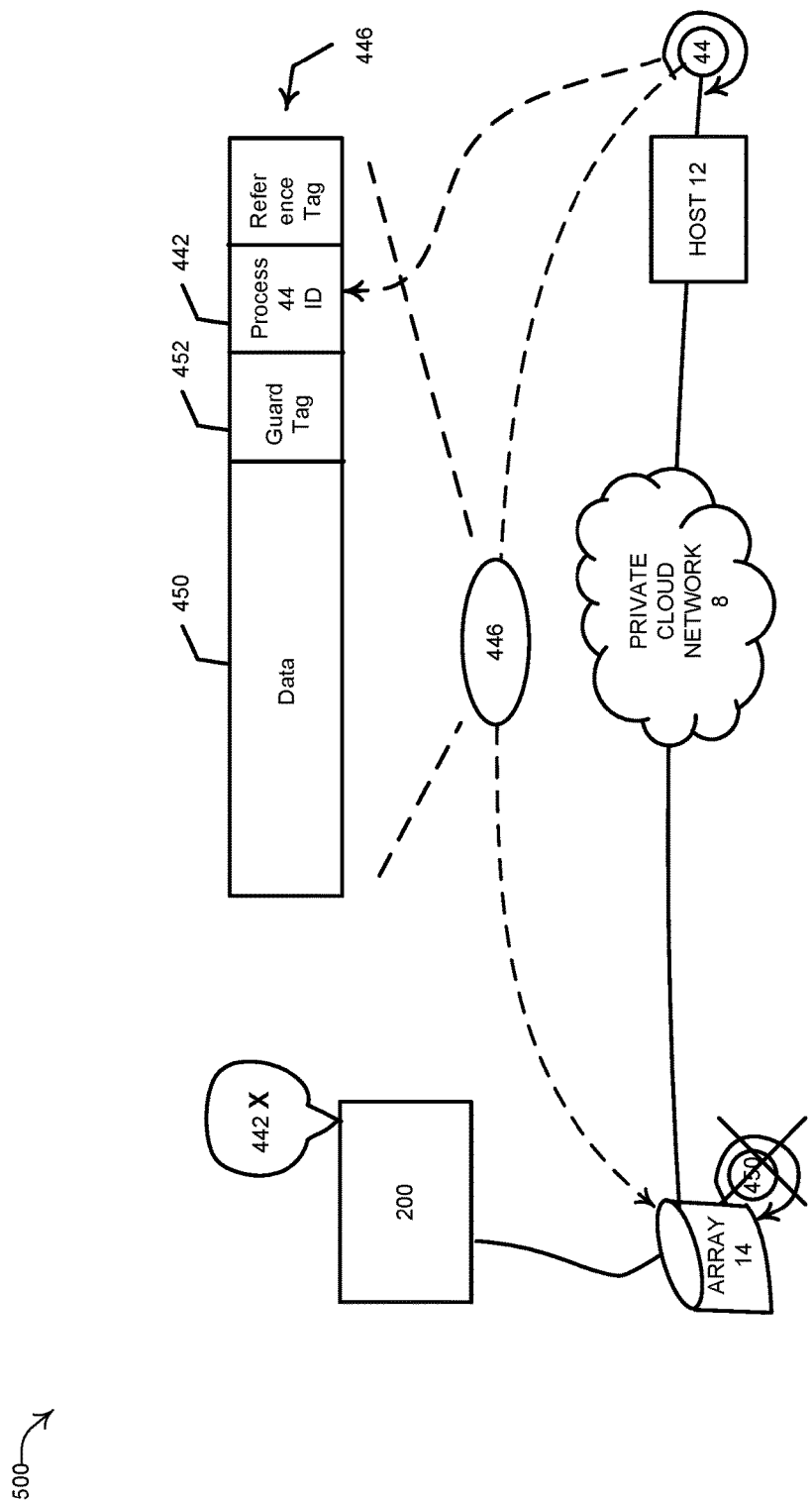
FIG. 5 illustrates an example computing environment with storage array rejecting a command corresponding to a block command message, transmitted by a host computing device, not having an application/processor identifier in an App Tag field matching a configured approved application identifier.

If, however, storage array 14 determines that an identifier corresponding to process 44 is not indicative that process 44 has been configured, via table 200, as a process with respect to which the storage array should perform an action received in a command message generated by the application (indicated by the 'X' in the bubble above table 200 in FIG. 5), then the storage array may not perform the action, for example, the array does not write data 450 to a volume corresponding to process 44 (indicated by 'X' over the process symbol corresponding to data 450 in FIG. 5).

Figure 6:
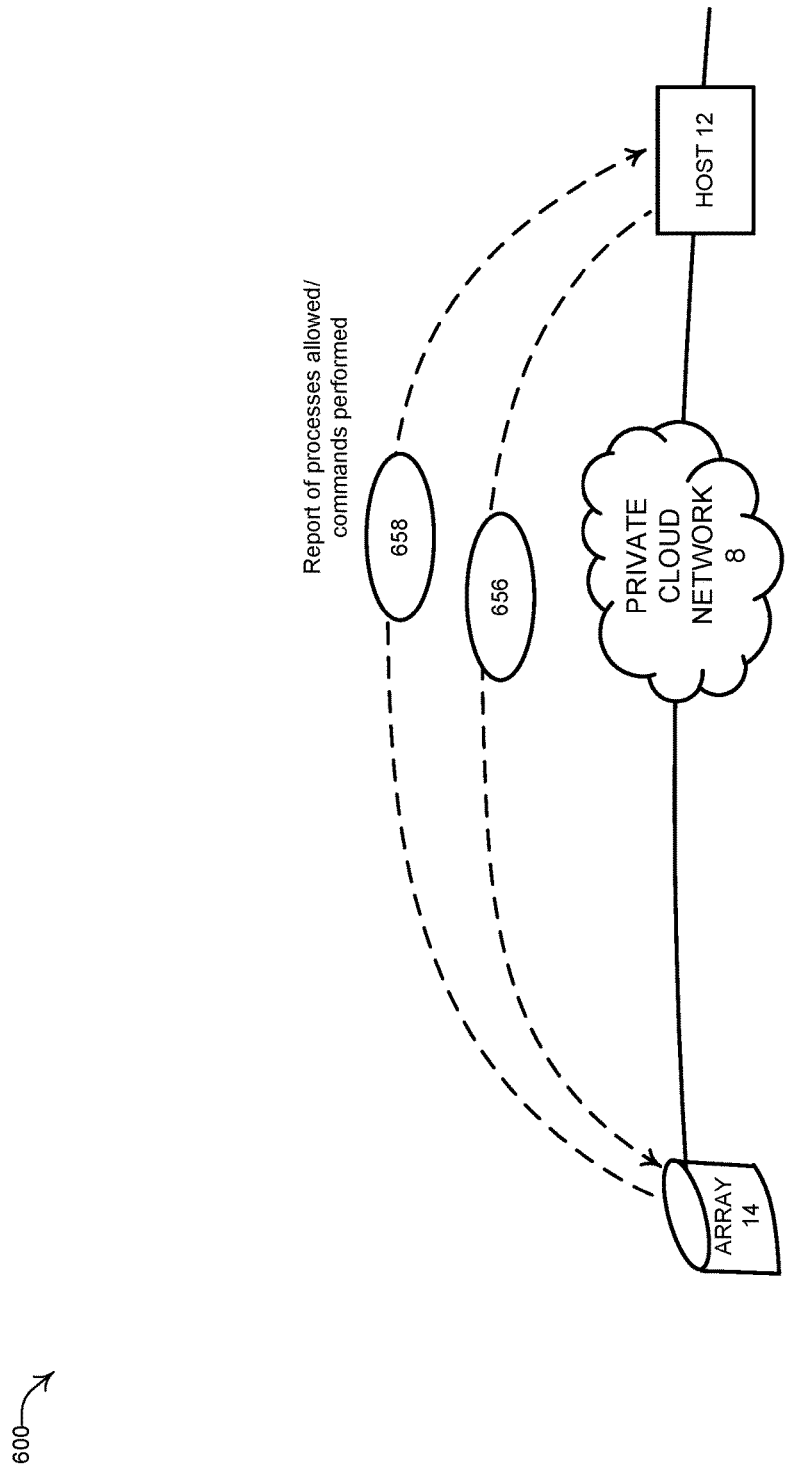
FIG. 6 illustrates an example computing environment with a storage array transmitting to a host computing device a volume-specific process allowance report.

Turning now to FIG. 6, the figure illustrates computer environment 600 wherein host computing device 12 may transmit an accounting request 656 to storage array 14. Accounting request 656 may be a one-time request for storage array 14 to transmit an accounting report 658 to the host computing device. Accounting request 656 may be a configured request indicative to storage array 14 to transmit an accounting report 658 to the host computing device periodically. An accounting report 658 may comprise an indication of a command (e.g., read or write) corresponding to a process's block command message comprising data and a process identifier in an App Tag field being performed, as described in reference to FIG. 4. An accounting report may comprise an indication of a command corresponding to a process's block command message comprising data and a process identifier in an App Tag field being rejected, as described in reference to FIG. 5. Accounting report 658 may comprise information corresponding to commands associated with processes that were performed or not performed based on whether a process identifier in an App Tag field corresponded to a process configured via configuration table 200 as being a process that is authorized to communicate with the storage array, or a volume thereof, corresponding to the process.

Figure 7:
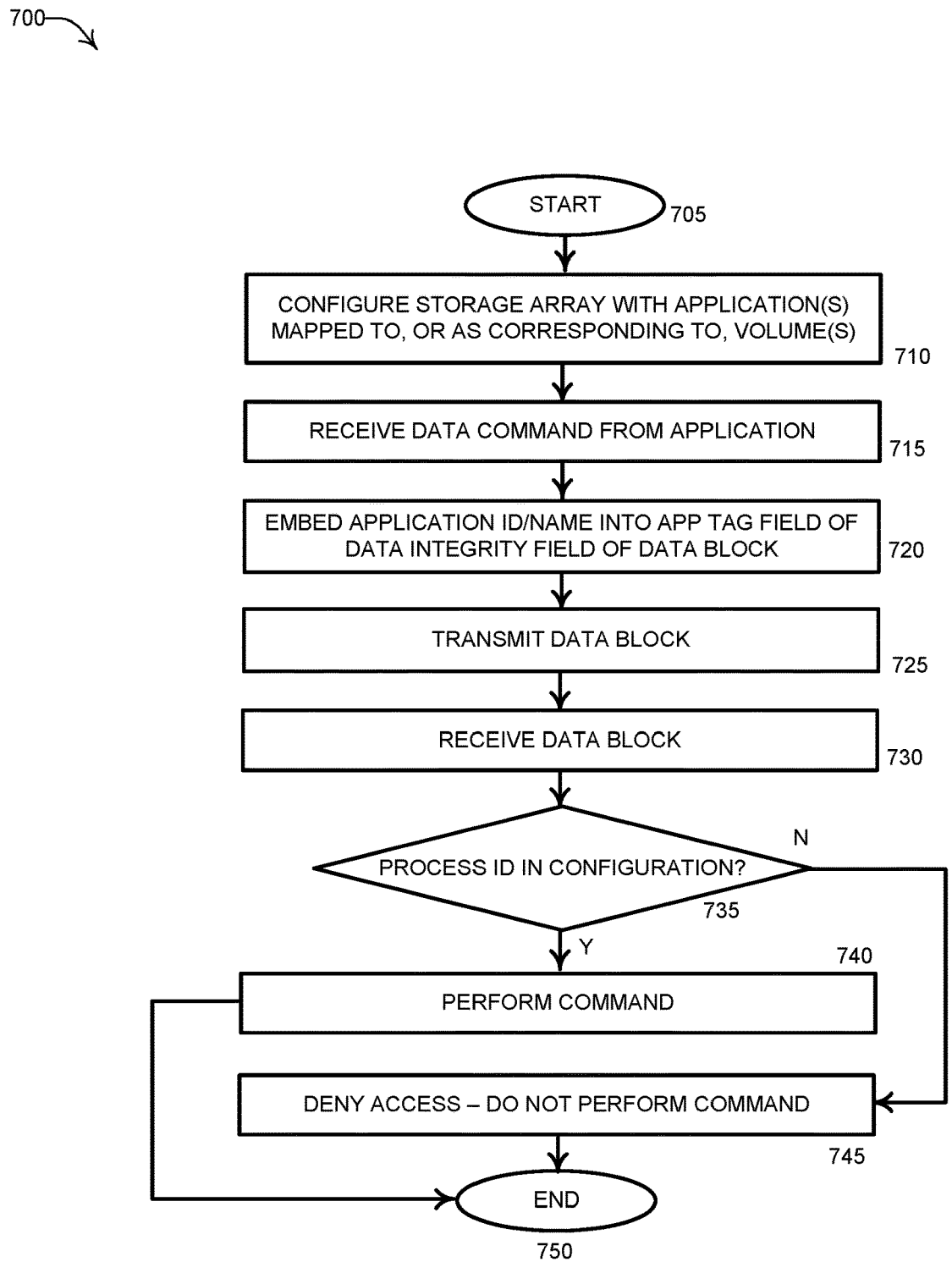
FIG. 7 illustrates a flow diagram of an example method to configure a storage array to analyze an application identifier, or a process identifier, in an App Tag field of a block command message to determine whether to implement a commanded action corresponding to the block command message.

Turning now to FIG. 7, the figure illustrates a flow diagram of an example method 700 that may be used to verify data input or output commands at a storage array. Method 700 begins at act 705. At act 710, a storage array may be configured with one or more identifiers, or indexes, corresponding to one or more applications, or processes, that may be mapped to or that may correspond to, or that may be associated with one or more volumes of the storage array. The configuration may be generated or transmitted by a host computing device, or by a management console corresponding to the host computing device or corresponding to the storage array. At act 715, the host computing device may receive a command generated by an application or process configured at act 710. The command may be a read or a write command, or other protocol command, such as a SCSI protocol command. At act 720, the host computing device may embed a process identifier corresponding to the application in an App Tag metadata field, which may be a two-byte field of a 520 byte block command message comprising a 512 byte data field and the two byte app tag field. At act 725, the host computing device may transmit the block command message and a CDB command message associated with the block command message-the CDB message may comprise a command instructing the storage array to perform an act with respect to the data in the 512-byte data field of the block command message. For example, the command may be a write command instructing the storage array to write data in the 512-byte data field to a storage volume corresponding to the application that generated the CDB command and block command messages. The storage array may receive the block command message comprising the process identifier in an App Tag field at act 730.

At act 735, the storage array may determine whether a process identifier contained in the App Tag field in the block command message received at act 730 is a process identifier contained in the configuration received at act 710. If a determination made at act 735 is that a process identifier contained in an App Tag field of a block command message received at act 730 is a process identifier of a configuration received at act 710, the storage array may perform a command, for example a write command, with respect to data contained in a data portion of the block command message received at act 730, and method 700 ends at act 750.

However, if a determination made at act 735 is that a process identifier contained in an App Tag field of a block command message received at act 730 is not in a configuration received at act 710, the storage array may deny access to the process corresponding to the process identifier. For example, if a command associated with data in a data field of the block command message received at act 730 is to write data to a volume of the storage array, the storage array may reject writing of the data contained in the block command message, and method 700 may advance to act 750 and end.

Figure 8:
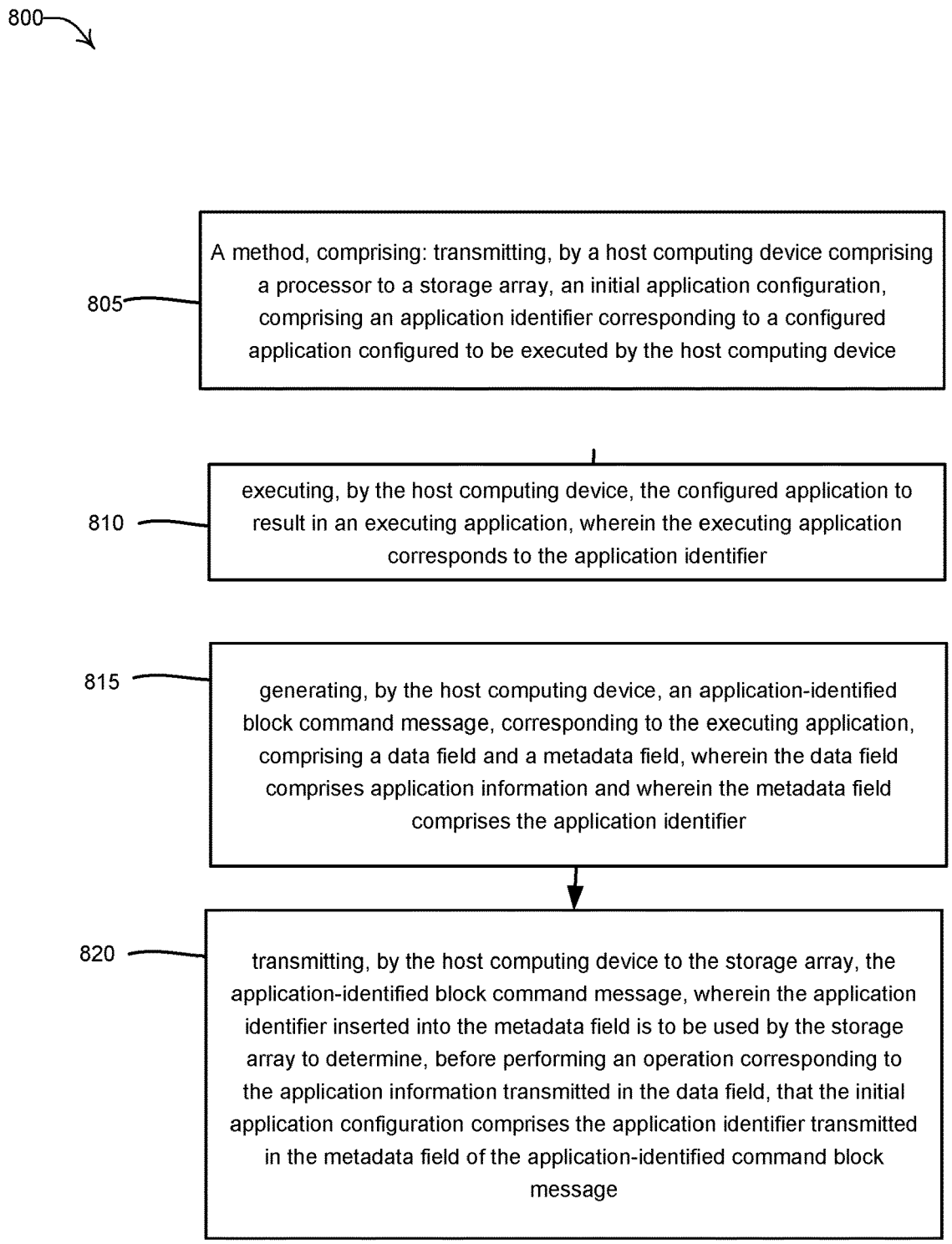
FIG. 8 illustrates an exemplary method embodiment.

Turning now to FIG. 8, the figure illustrates an example method 800, comprising at act 805 transmitting, by a host computing device comprising a processor to a storage array, an initial application configuration, comprising an application identifier corresponding to a configured application configured to be executed by the host computing device; at act 810 executing, by the host computing device, the configured application to result in an executing application, wherein the executing application corresponds to the application identifier; at act 815 generating, by the host computing device, an application-identified block command message, corresponding to the executing application, comprising a data field and a metadata field, wherein the data field comprises application information and wherein the metadata field comprises the application identifier; and at act 820 transmitting, by the host computing device to the storage array, the application-identified block command message, wherein the application identifier inserted into the metadata field is to be used by the storage array to determine, before performing an operation corresponding to the application information transmitted in the data field, that the initial application configuration comprises the application identifier transmitted in the metadata field of the application-identified command block message.

Figure 9:
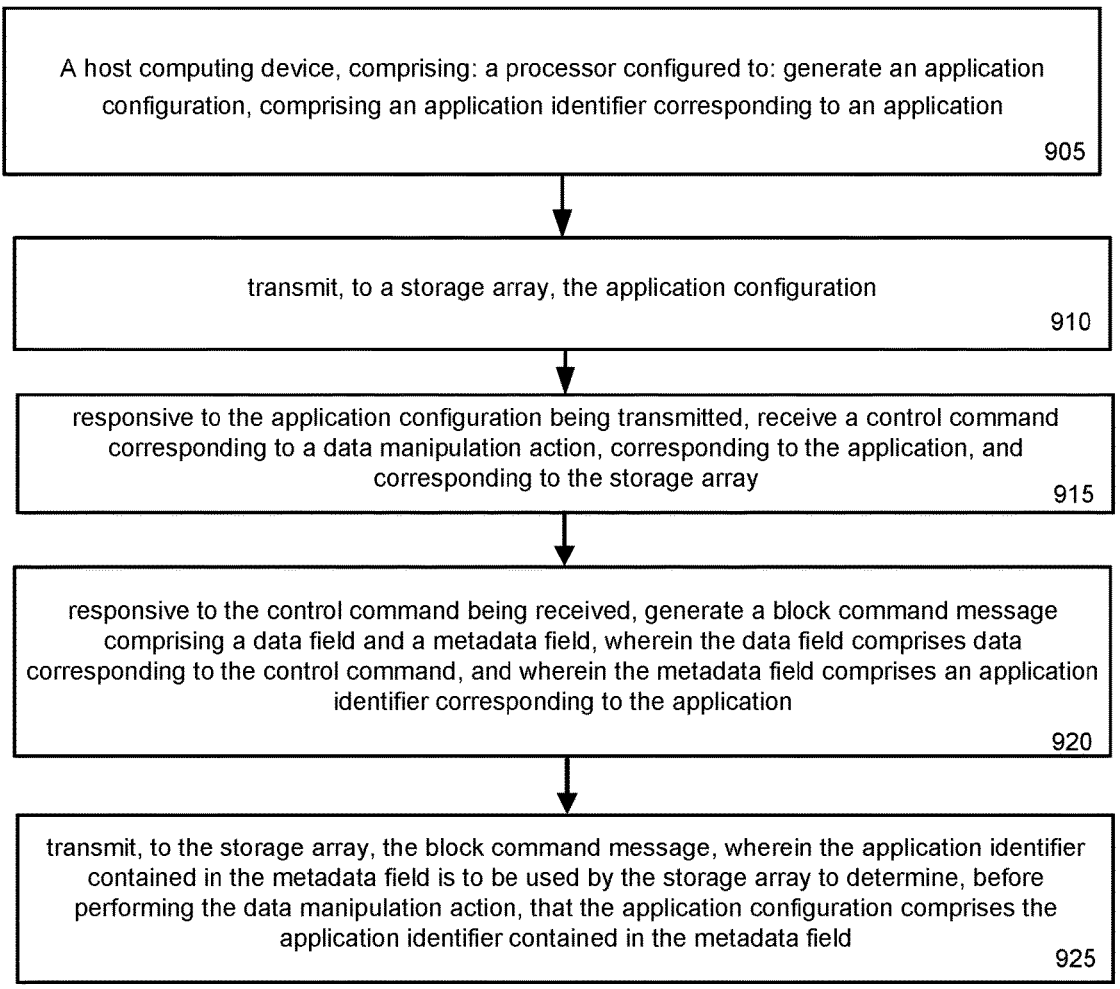
FIG. 9 illustrates an exemplary host computing device embodiment.

Turning now to FIG. 9, the figure illustrates an example host computing device 900, comprising at block 905 a processor configured to generate an application configuration, comprising an application identifier corresponding to an application; at block 910 transmit, to a storage array, the application configuration; at block 915 responsive to the application configuration being transmitted, receive a control command corresponding to a data manipulation action, corresponding to the application, and corresponding to the storage array; at block 920 responsive to the control command being received, generate a block command message comprising a data field and a metadata field, wherein the data field comprises data corresponding to the control command, and wherein the metadata field comprises an application identifier corresponding to the application; and at block 925 transmit, to the storage array, the block command message, wherein the application identifier contained in the metadata field is to be used by the storage array to determine, before performing the data manipulation action, that the application configuration comprises the application identifier contained in the metadata field.

Figure 10:
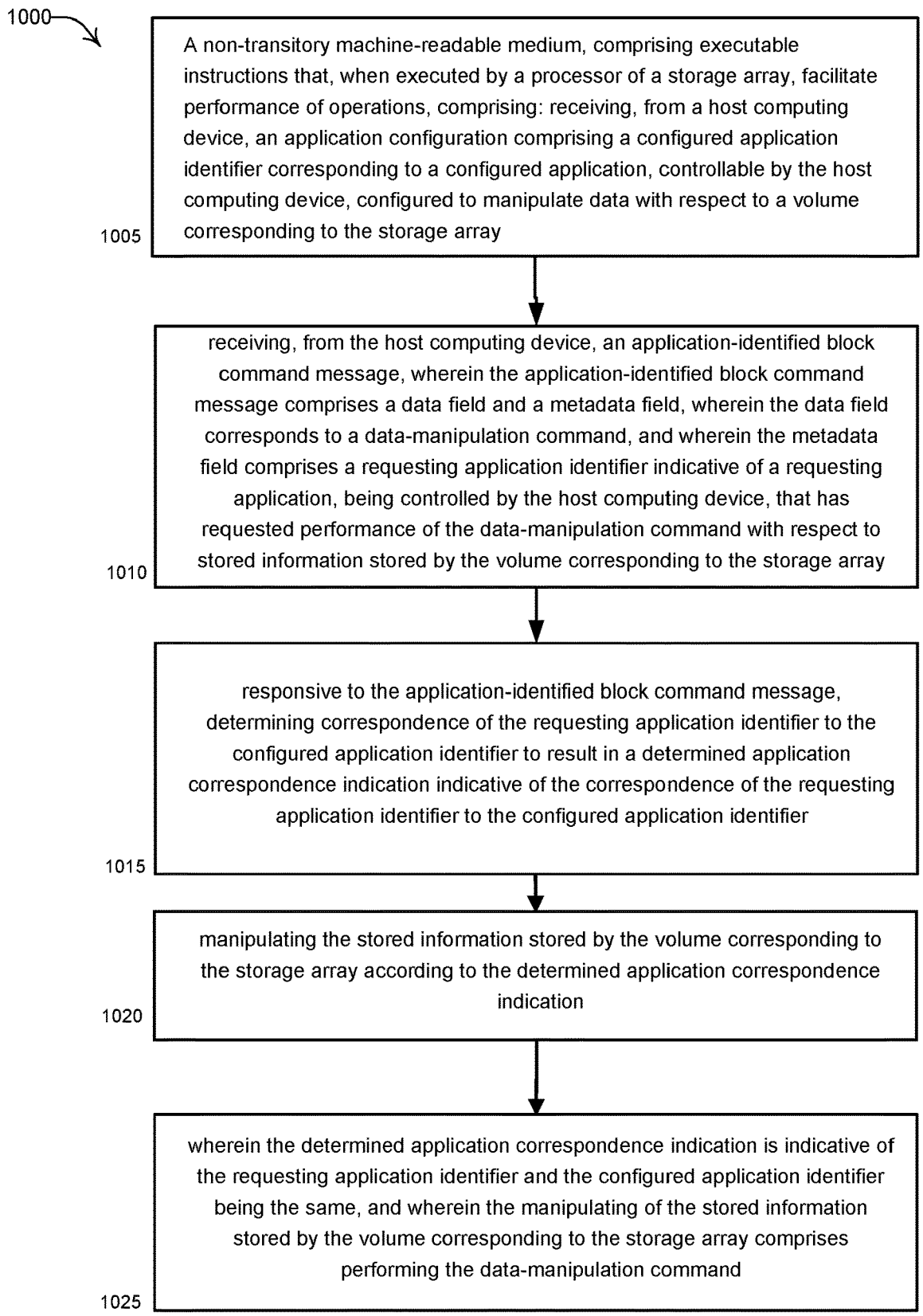
FIG. 10 illustrates an exemplary non-transitory machine-readable medium embodiment.

Turning now to FIG. 10, the figure illustrates a non-transitory machine-readable medium 1000, comprising executable instructions that, when executed by a processor of a storage array, facilitate performance of operations, comprising at block 1005 receiving, from a host computing device, an application configuration comprising a configured application identifier corresponding to a configured application, controllable by the host computing device, configured to manipulate data with respect to a volume corresponding to the storage array; at block 1010 receiving, from the host computing device, an application-identified block command message, wherein the application-identified block command message comprises a data field and a metadata field, wherein the data field corresponds to a data-manipulation command, and wherein the metadata field comprises a requesting application identifier indicative of a requesting application, being controlled by the host computing device, that has requested performance of the data-manipulation command with respect to stored information stored by the volume corresponding to the storage array; at block 1015 responsive to the application-identified block command message, determining correspondence of the requesting application identifier to the configured application identifier to result in a determined application correspondence indication indicative of the correspondence of the requesting application identifier to the configured application identifier; at block 1020 manipulating the stored information stored by the volume corresponding to the storage array according to the determined application correspondence indication; and at block 1025 wherein the determined application correspondence indication is indicative of the requesting application identifier and the configured application identifier being the same, and wherein the manipulating of the stored information stored by the volume corresponding to the storage array comprises performing the data-manipulation command.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1120 (see below), non-volatile memory 1122 (see below), disk storage 1124 (see below), and memory storage, e.g., local data store(s) 1130 and remote data store(s) 1150, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 11:
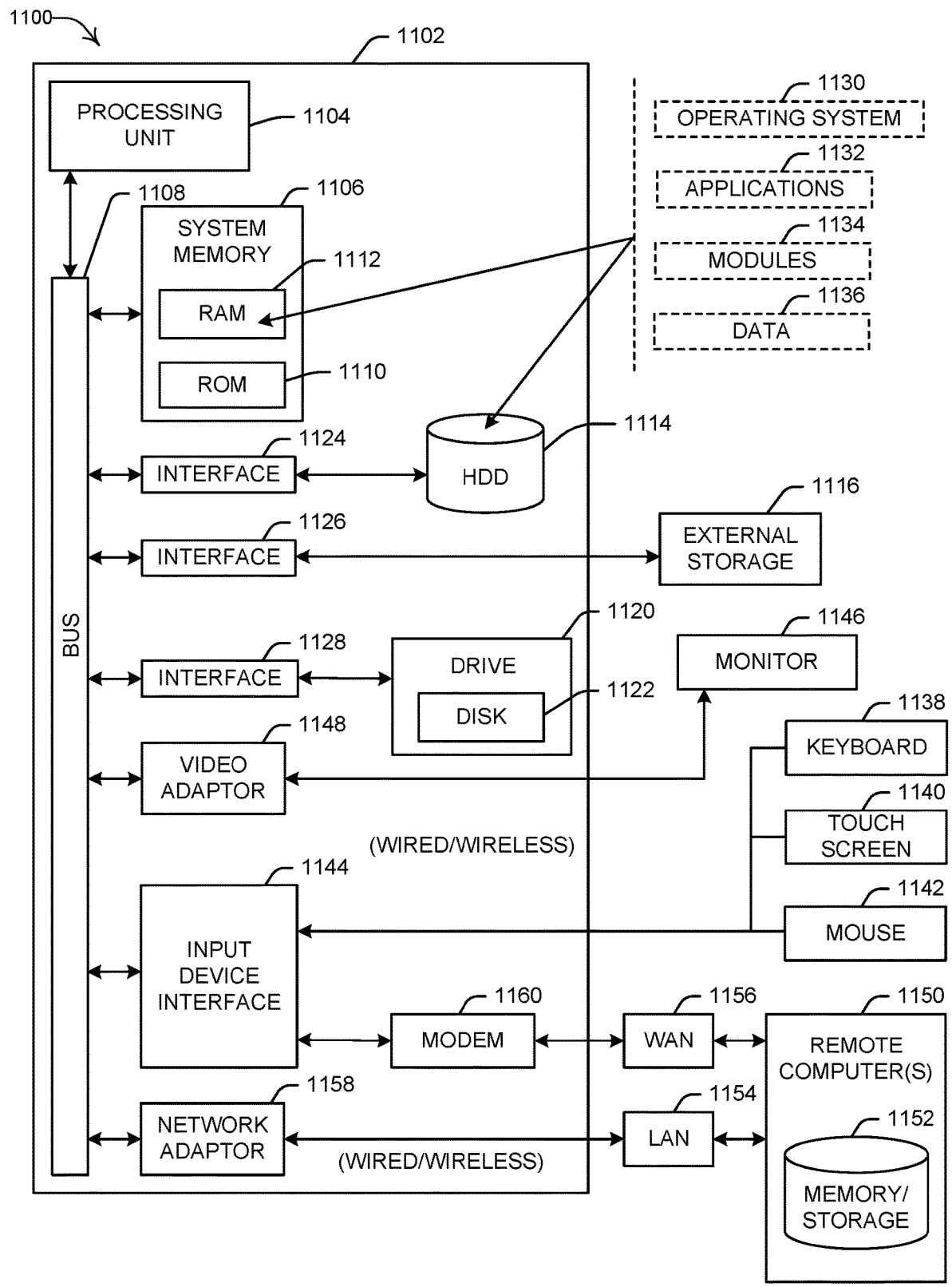
FIG. 11 illustrates an example block diagram of a computer operable to execute an embodiment of this disclosure.

Referring now to FIG. 11, in order to provide additional context for various embodiments described herein, FIG. 11 and the following discussion are intended to provide a brief, general description of a suitable computing environment 1100 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    transmitting, by a host computing device comprising a processor to a storage array, an initial application configuration, comprising an application identifier corresponding to a configured application configured to be executed by the host computing device;
    executing, by the host computing device, the configured application to result in an executing application, wherein the executing application corresponds to the application identifier;
    generating, by the host computing device, an application-identified block command message, corresponding to the executing application, comprising a data field and a metadata field, wherein the data field comprises application information and wherein the metadata field comprises the application identifier; and
    transmitting, by the host computing device to the storage array, the application-identified block command message, wherein the application identifier inserted into the metadata field is to be used by the storage array to determine, before performing an operation corresponding to the application information transmitted in the data field, that the initial application configuration comprises the application identifier transmitted in the metadata field of the application-identified command block message,
    wherein the initial application configuration comprises an association between the configured application configured to be executed by the host computing device and at least one logical volume corresponding to the storage array;
    requesting, by the host computing device from the storage array, a volume-specific process allowance report indicative of performance of the operation corresponding to the application information transmitted in the data field of the application-identified command block message; and
    receiving, from the storage array, the volume-specific process allowance report indicative of the performance of the operation corresponding to the application information transmitted in the data field of the application-identified command block message with respect to the at least one logical volume corresponding to the storage array.

2. The method of claim 1, wherein the application-identified block command message is a small computer system interface protocol message.

3. The method of claim 2, wherein the metadata field is part of a data integrity field.

4. The method of claim 1, wherein the initial application configuration comprises an association between the configured application configured to be executed by the host computing device and at least one logical volume corresponding to the storage array.

5. The method of claim 1, wherein the executing application corresponds to a process and wherein the application identifier comprises a process identifier corresponding to the process.

6. The method of claim 5, wherein the initial application configuration comprises a process index corresponding to the process identifier, and wherein the application identifier in the metadata field of the application-identified block command message comprises the process index.

7. The method of claim 1, further comprising:
    determining, by the host computing device, to remove the application identifier corresponding to the configured application configured to be executed by the host computing device from the initial application configuration;
    updating, by the host computing device, the initial application configuration to be indicative that the configured application is no longer configured to be executed by the host computing device, to result in an updated application configuration; and transmitting, by the host computing device to the storage array, the updated application configuration to be used, by the storage array, instead of the initial application configuration.

8. A host computing device, comprising:

a processor configured to:

generate an application configuration, comprising an application identifier corresponding to an application;

transmit, to a storage array, the application configuration;

responsive to the application configuration being transmitted, receive a control command corresponding to a data manipulation action, corresponding to the application, and corresponding to the storage array;

responsive to the control command being received, generate a block command message comprising a data field and a metadata field, wherein the data field comprises data corresponding to the control command, and wherein the metadata field comprises an application identifier corresponding to the application; and transmit, to the storage array, the block command message, wherein the application identifier contained in the metadata field is to be used by the storage array to determine, before performing the data manipulation action, that the application configuration comprises the application identifier contained in the metadata field, wherein the application configuration comprises an association between the application and at least one logical volume corresponding to the storage array;

request, from the storage array, a volume-specific process allowance report indicative of performance of the data manipulation action with respect to the at least one logical volume; and receive from the storage array, the volume-specific process allowance report indicative of the performance of the data manipulation action.

9. The host computing device of claim 8, wherein the block command message is a small computer system interface protocol message.

10. The host computing device of claim 9, wherein a data integrity field comprises the metadata field.

11. The host computing device of claim 9, wherein the small computer system interface protocol message is transmitted according to a fibre channel protocol.

12. The host computing device of claim 8, wherein the application corresponds to a process, and wherein the application identifier comprises a process identifier corresponding to the process.

13. The host computing device of claim 12, wherein the application configuration comprises a process index corresponding to the process identifier, and wherein the application identifier comprises the process index.

14. The host computing device of claim 8, wherein the application configuration is an initial application configuration, and wherein the processor is further configured to:

determine to remove the application identifier from the initial application configuration;

update the initial application configuration to be indicative that the configured application is not configured to be executed by the host computing device, to result in an updated application configuration; and transmit the updated application configuration to the storage array to be used thereby instead of the initial application configuration.

15. A non-transitory machine-readable medium, comprising executable instructions that, when executed by a processor of a storage array, facilitate performance of operations, comprising:

receiving, from a host computing device, an application configuration comprising a configured application identifier corresponding to a configured application, controllable by the host computing device, configured to manipulate data with respect to a volume corresponding to the storage array;

receiving, from the host computing device, an application-identified block command message, wherein the application-identified block command message comprises a data field and a metadata field, wherein the data field corresponds to a data-manipulation command, and wherein the metadata field comprises a requesting application identifier indicative of a requesting application, being controlled by the host computing device, that has requested performance of the data-manipulation command with respect to stored information stored by the volume corresponding to the storage array;

responsive to the application-identified block command message, determining correspondence of the requesting application identifier to the configured application identifier to result in a determined application correspondence indication indicative of the correspondence of the requesting application identifier to the configured application identifier; and manipulating the stored information stored by the volume corresponding to the storage array according to the determined application correspondence indication, wherein the application configuration comprises an association between the application and at least one logical volume corresponding to the storage array;

receiving, from the host computing device, a request for a volume-specific process allowance report indicative of performance of a data manipulation action corresponding to the data-manipulation command with respect to the at least one logical volume; and responsive to the request for the volume-specific process allowance report, transmitting, to the host computing device, the volume-specific process allowance report.

16. The non-transitory machine-readable medium of claim 15, wherein the determined application correspondence indication is indicative of the requesting application identifier and the configured application identifier being the same, and wherein the manipulating of the stored information stored by the volume corresponding to the storage array comprises performing the data-manipulation command.

17. The non-transitory machine-readable medium of claim 15, wherein the data-manipulation command is at least one of: a read command or a write command.

18. The non-transitory machine-readable medium of claim 15, wherein the determined application correspondence indication is indicative of the requesting application identifier and the configured application identifier being different, and wherein the manipulating of the stored information stored by the volume corresponding to the storage array comprises non-performance of the data-manipulation command.

19. The non-transitory machine-readable medium of claim 15, wherein the configured application corresponds to a process, wherein the application identifier comprises a process identifier corresponding to the process, wherein the application configuration comprises a process index corresponding to the process identifier, and wherein the requesting application identifier received in the metadata field of the application-identified command block message comprises the process index.

20. The non-transitory machine-readable medium of claim 15, wherein the application-identified block command message comprises 520 bytes, wherein the data field of the application-identified block command message comprises 512 bytes, wherein the metadata field of the application-identified command block message is an eight-byte field that comprises a two-byte App Tag field, and wherein the requesting application identifier is received in the two-byte App Tag field.

\* \* \* \* \*